Dec. 23, 1958     G. V. CONSTANTAKIS     2,865,054
METHOD OF FORMING TIRE TREADS
Filed June 14, 1955     2 Sheets-Sheet 1
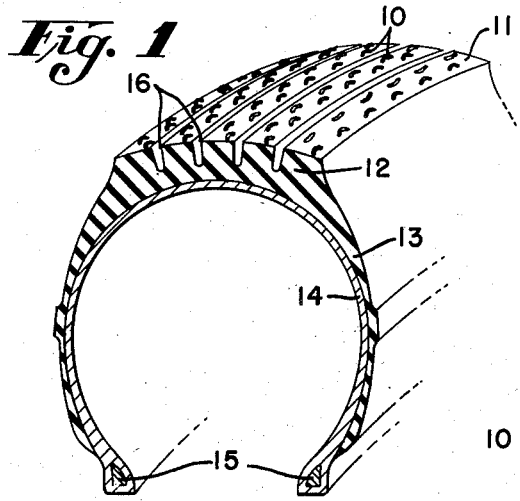
Fig. 1
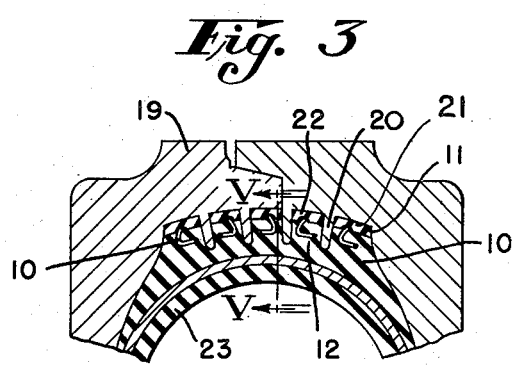
Fig. 3
Fig. 4
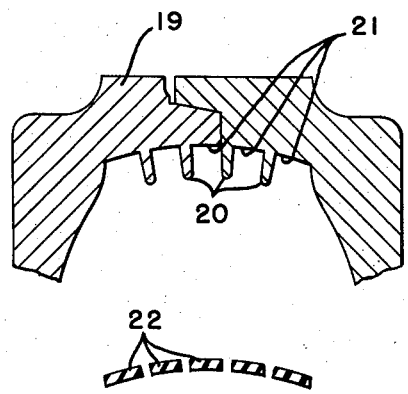
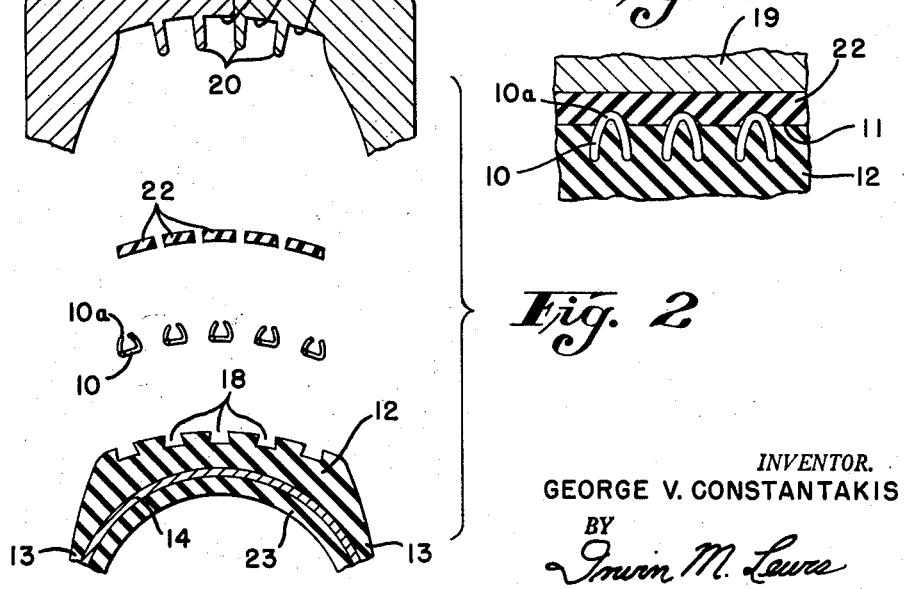
Fig. 5
Fig. 2
*INVENTOR.*
GEORGE V. CONSTANTAKIS
BY
Irwin M. Lewis
ATTORNEY.

Dec. 23, 1958  G. V. CONSTANTAKIS  2,865,054
METHOD OF FORMING TIRE TREADS
Filed June 14, 1955  2 Sheets—Sheet 2
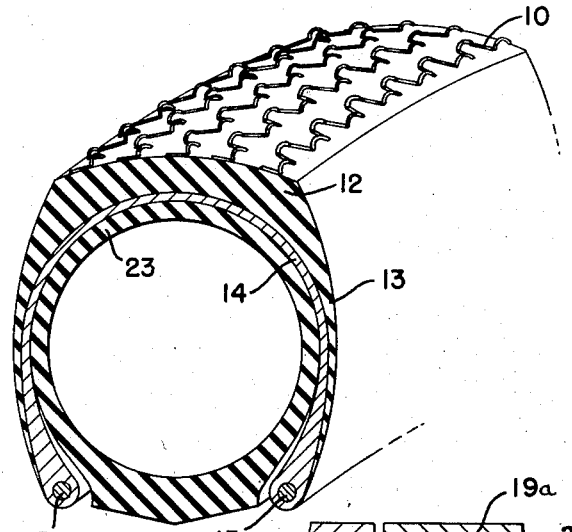
*Fig. 7*
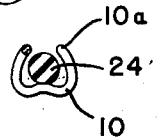
*Fig. 6*
*Fig. 8*
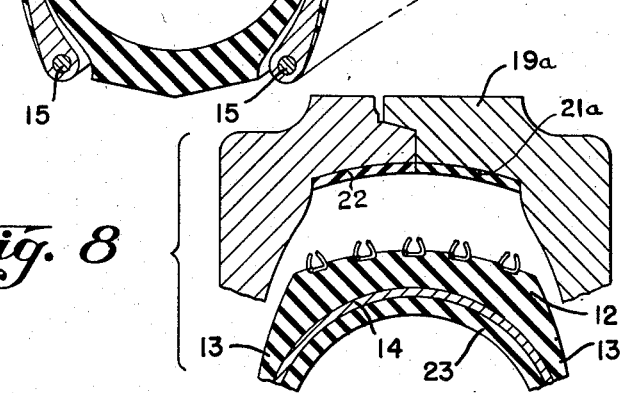
*Fig. 10*
*Fig. 9*
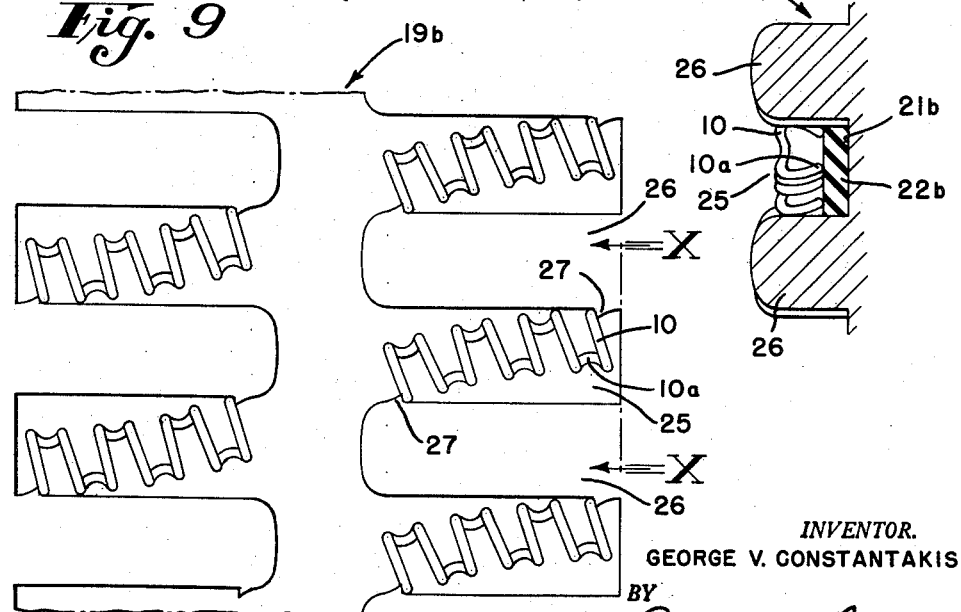
INVENTOR.
GEORGE V. CONSTANTAKIS
BY
*Irwin M. Lewis*
ATTORNEY.

United States Patent Office 2,865,054
Patented Dec. 23, 1958

2,865,054

METHOD OF FORMING TIRE TREADS

George V. Constantakis, Allen Park, Mich., assignor to United States Rubber Company, New York, N. Y., a corporation of New Jersey Application June 14, 1955, Serial No. 515,479

9 Claims. (Cl. 18—59)

This invention relates to a method for forming rubber treads of tires of the type incorporating hard elements therein to increase the traction properties of the treads on wet pavements, snow or ice covered roads, and in off-the-road operation.

Tires of this type made by methods heretofore proposed had the hard elements completely buried in the tread with the result that a certain amount of a tread surface had to be worn away before the hard elements became effective to increase the traction properties of the tread.

The object of the present invention is to provide a method for forming pneumatic tire treads incorporating hard elements therein, and in particular metal wires, such that the hard elements will project from the tread surface of the tire as removed from the tire mold so as to be immediately effective for increasing the traction of the treads.

In accordance with the invention, the tread forming surface of a tire mold is lined with a soft, impressionable material having at ambient temperature a Shore durometer hardness (scale A) of between 57 and 62. A fabricated tire incorporating the hard elements in or on the uncured tread thereof is placed in the mold and expanded and heated in the conventional manner to mold the tread. Upon expansion of the tire casing in the mold, the hard elements are forced into the impressionable material by the underlying tread material so that upon removal of the tire from the mold, the hard elements will project from the surface of the tread and thereby be immediately effective to increase the traction thereof.

The method of the invention having been broadly described, a more detailed description is given hereafter by reference to the accompanying drawings wherein:

Fig. 1 is a perspective sectional view of a portion of a pneumatic tire made in accordance with the present invention showing how the hard elements incorporated in the tread of the tire project through the tread surface of the tire as molded so as to be immediately effective to increase the traction properties of the tread;

Fig. 2 is an exploded partial sectional view showing the relative relationship of the tire mold used in forming a ribbed tread of the type shown in Fig. 1, the mold lining material, the hard traction elements, the uncured fabricated tire, and the curing bag or diaphragm used to expand the tire in the mold and also illustrating one method of incorporating the traction elements in the uncured tread, viz., by placement thereof in grooves formed in the surface of the uncured tread;

Fig. 3 is a partial sectional view showing the tire in the mold of Fig. 2 during the molding thereof and illustrating how the hard elements project through the tread surface into the impressionable liner material so that when the tire is removed from the mold the hard elements will be projecting from the tread surface and be immediately effective to increase the traction thereof;

Fig. 4 is a plan view of one of the hard traction elements; the element illustrated being in the form of a crimped wire providing projecting loops;

Fig. 5 is a sectional view taken on the line V—V of Fig. 3;

Fig. 6 is a sectional view of one of the wire traction elements showing the incorporation of filler stock therewith;

Fig. 7 is a perspective sectional view illustrating an alternate method of incorporating the traction elements in the uncured tread of the tire by stretching the elements around the shaped but uncured tread so that the elements become embedded in the tread by the tension forces therein;

Fig. 8 is an exploded partial sectional view showing the relative positions of a mold, uncured tire and curing bag or diaphragm, and illustrating forming of a non-ribbed tread in accordance with the present invention;

Fig. 9 is a plan view of a portion of the tread forming surface of a tire mold for forming treads having transversely extending lugs or ribs and illustrating an alternative method of incorporating the traction elements in the tread in which the spring elements are placed in and held in the tire mold and incorporated in the treads simultaneously with the molding and curing of the tread; and Fig. 10 is a partial sectional view taken on the line X—X of Fig. 9 showing the impressionable lining material disposed between the ribs of the tread forming surface of the mold shown in Fig. 9.

Referring to Fig. 1, in which there is shown a portion of a finished tire formed in accordance with the present invention, it can be seen that a portion of the hard traction elements 10 project from the surface 11 of the tread 12 of the tire as removed from the tire mold and before usage thereof so that the elements 10 are immediately effective to increase the traction properties of the tread upon initial use thereof. In the embodiment illustrated, the elements 10 are in the form of crimped metal wires having projecting loops 10a. The tire is otherwise of conventional construction and includes, in addition to the rubber tread 12, rubber sidewalls 13, a fabric carcass 14 to which the tread and sidewalls are bonded during vulcanizing and molding, and bead wire bundles 15 to which the carcass is anchored. The tread of a tire may be divided into circumferentially extending ribs by circumferentially extending grooves 16.

The uncured tire, such as shown in Figs. 2 and 7, is generally fabricated in the conventional manner on a tire building drum by the sequential application of plies of rubberized fabric to form the carcass 14 and strips of rubber to form the sidewalls 13 of the tread 12.

Traction elements 10 may be incorporated in the tread prior to the molding and curing thereof as illustrated in Figs. 2 and 7 or simultaneously with the molding and curing thereof as illustrated in Fig. 9.

Referring to Fig. 2, the elements 10 are placed in grooves 18 formed in the uncured tread 12. While the grooves 18 are shown as extending circumferentially, it will be appreciated that they could be provided to extend in various directions other than circumferential. The elements 10 are placed in the grooves 18 either while the tire is still in flat band shape on the tire building drum or after the tire has been shaped but before curing. If the elements 10 are placed circumferentially around the tread while the tread is in flat band shape, the elements should be fairly extensible or otherwise in the subsequent expanding and shaping of the tire they would embed too deeply in the tread. The grooves 18 are preferably undercut or of a dove tail shape so as to retain the elements 10 therein during subsequent handling of the fabricated but uncured tire. Additional strips of filler stock 24 may be placed within the wire elements 10 as shown in Fig. 6 to expedite the filling in around the elements 10 during subsequent molding and curing of the tire.

In Fig. 7 there is shown an alternative method for incorporating the wire elements 10 in the uncured tread 12. In this method, the uncured tire is first shaped around a curing bag 23. While the uncured tire is still around the curing bag, the elements 10 are stretched tightly around the tread and their ends secured together so that the contractive forces created therein due to their stretch condition will cause the elements to become embedded within a period of time in the uncured tread stock 12 without the necessity of providing grooves in the tread stock 12 as shown in Fig. 2. If desired the elements 10 can be formed as annuli having diameters less than that of the tread and then stretched and placed around the tread so that the elements will become embedded in the tread by the tension forces created therein by the stretching thereof.

After the elements 10 have been incorporated in the tread stock 12 and the tire shaped, the tire is placed in a tire mold such as the ribbed mold 19 shown in Fig. 2 or the smooth mold 19a, shown in Fig. 8. The molds 19 and 19a are generally of conventional rigid metal construction. In accordance with the invention the outer mold tread forming surfaces 21 between the ribs 20 of the mold 19 or the outer tread forming surface 21a of the mold 19a are lined with soft impressionable material 22 having at ambient temperature a Shore durometer hardness (scale A) of between 57 and 62 which is preferably cemented to or otherwise fixed to the mold surface. The lining material 22 once applied to the mold remains with the mold and may be used for molding a number of tires. A cured natural rubber stock such as that used for making some types of curing bags has been found satisfactory for this purpose. Such a stock consists principally of 100 parts of natural rubber, 20 parts of channel black, 80 parts of clay, and the usual vulcanizing and curing agents and has at ambient teperature a Shore durometer hardness (scale A) of approximately 61. However, other relatively soft, impressionable materials are satisfactory.

Before the fabricated, but uncured, tire is placed in the mold, the tire, the interior of the mold, or both are coated with a suitable mold lubricant, such as powdered soapstone, to prevent sticking of the tire to the mold or lining during the molding thereof and to facilitate the removal of the tire from the mold after molding. The uncured tire is then placed in the mold and molded and vulcanized in the conventional manner by expanding the tire against the interior wall of the heated tire mold 19 or 19a by inflation of a conventional curing bag or diaphragm 23 which engages the interior surface of the tire.

The expansion of the tire by inflation of the curing bag or diaphragm 23 and the flow of the tread stock forces the elements 10 into the impressionable lining material 22 during the vulcanizing and molding of the tire so that the loops 10a thereof project beyond the tread surface 11 of the tread 12 of the tire as shown in Figs. 3 and 5. The remaining portions of the elements 10 are securely anchored in the tread 12 by the flow of rubber therearound during the vulcanizing and molding of the tire. The elements 10 in the molded tire as removed from the mold are, therefore, securely anchored in the tread 12 and project beyond the tread surface as shown in Fig. 1 so as to be immediately effective to increase the traction properties of the tread.

Instead of incorporating the traction elements 10 in the uncured tread stock 12 prior to molding, the elements may be placed in the tire mold and embedded in the tread stock during subsequent molding and curing of the tire. As shown in Fig. 10, short sections of the traction elements 10 are placed in the grooves 25 between the ribs 26 of a tire mold 19b. The grooves 25 form transversely extending tread ribs or lugs on the tread of the tire molded in the mold 19b. The sections of the traction elements 10 are compressed longitudinally and placed between shoulders or ledges 27 formed on the side of adjacent ribs 26. The compressed condition of the sections of traction elements 10 hold the sections in place during placement of the uncured tire in the mold. In accordance with the invention, the outer tread forming surfaces 21b between the mold ribs 26 are lined with strips of impressionable material 22b, as best shown in Fig. 10, and during molding and curing of the tire, a portion of the traction elements 10 are anchored in the tread stock and the remaining portions forced into the impressionable lining strips 22b so that when the tire is removed from the mold the loops 10a project beyond the tread surface.

While the invention has been described in connection with the use of metal wire traction elements, and while the use of such elements form a part of the present invention, it will be appreciated that the invention is not limited to the use of wire and that the method is adapted for use in making tires incorporating various types of hard traction elements in the tread thereof. It will also be appreciated that the method is useful in retreading or recapping used tires as well as in manufacturing new tires.

The term "rubber" is used herein to denote natural rubber, synthetic rubber or blends thereof.

Having thus described my invention, what I claim and desire to protect by Letters Patent is:

1. A method of forming the rubber tread of a tire comprising, incorporating hard traction elements in the rubber tread of the tire, vulcanizing and molding said tread by heating the tread and pressing it by application of pressure to the interior of the tire against a body of impressionable material so that the hard elements will be forced into the impressionable material, and then after vulcanization and molding stripping the tread from the impressionable material whereby the hard elements in the vulcanized tread will project from the surface of the tread so as to be immediately effective to increase the traction properties of the tread.

2. A method of forming the rubber tread of a tire comprising, incorporating hard traction elements in the rubber tread of the tire, vulcanizing and molding said tread by heating said tread and pressing it by application of pressure to the interior of the tire against spaced rigid ribs and against impressionable material interposed between said ribs whereby grooves will be formed in said tread and the hard elements in the tread between said grooves will be forced into said impressionable material, and then after vulcanizing and molding said tread, stripping said tread from said ribs and said impressionable material whereby the elements in the vulcanized and molded tread will project from the surface of the tread and be immediately effective to increase the traction properties of the tread.

3. A method of forming the rubber tread of a tire comprising, incorporating hard elements in the rubber tread of the tire before vulcanizing and molding of the tread, then placing the tire in a mold having outer tread forming surfaces thereof lined with an impressionable material, expanding the tire by the application of pressure to the interior of the tire to press and form the tread against the impressionable material lining the mold whereby the hard elements in the tread will be forced into the impressionable material, and after molding and vulcanizing stripping the tire and tread from the mold and impressionable material whereby the hard elements in the molded tread will project from the surface of the tread and be immediately effective to increase the traction properties of the tread.

4. The method of forming the rubber tread of a tire incorporating hard elements therein comprising, vulcanizing the unvulcanized tread of the tire incorporating the hard elements in a mold having tread surface forming portions thereof lined with an impressionable material whereby upon heating of the tread and expansion of the tire by pressure applied internally thereof to mold and vulcanize the tread, the hard elements will be driven into the impressionable lining material and into the unvulcanized tread and after vulcanization stripping the tire and tread from the mold and impressionable lining material whereby the hard elements will project from the surface of the tread and be immediately effective to increase the traction properties of the tread.

5. The method of forming the rubber tread of a tire incorporating hard elements therein comprising forming grooves in the unvulcanized tread stock, placing wire traction elements in the grooves, then vulcanizing the tread in a mold having the outer tread forming surfaces thereof lined with an impressionable material whereby upon heating of the tread and expansion of the tire by the application of pressure to the interior of the tire to mold and vulcanize said tread, portions of said wire traction elements will be driven into the impressionable lining material, and after vulcanization stripping the tire and tread from the mold and impressionable lining material whereby the hard elements will project from the surface of the tread and be immediately effective to increase the traction properties of the tread.

6. The method of forming the rubber tread of a tire incorporating hard elements therein comprising, forming undercut grooves in the unvulcanized tread stock, placing wire traction elements in the undercut grooves, then vulcanizing the tread in a mold having ribs for forming grooves in the tread surface and impressionable material lining the outer tread forming surfaces of the mold between said ribs whereby upon heating of the tread and expansion of the tire by the application of pressure to the interior of the tire to mold and vulcanize the tire, portions of said wire traction elements will be forced into said impressionable material, then after vulcanization and molding, stripping the tire and tread from the mold and impressionable lining material whereby the hard elements will project from the surfaces of the tread and be immediately effective to increase the traction properties of the tread.

7. The method of forming the rubber tread of a tire incorporating hard traction elements therein comprising, stretching wire traction elements circumferentially around the unvulcanized tread whereby the tension created in the elements will cause them to become embedded in the tread, and thereafter vulcanizing and molding the unvulcanized tread of the tire incorporating the hard elements in a mold having tread surface forming portions thereof lined with an impressionable material whereby upon heating of the tread and expansion of the tire by pressure applied internally thereof to mold and vulcanize the tread the hard elements will be forced into the impressionable lining material, and after vulcanization and molding stripping the tire and tread from the mold and impressionable lining material whereby the hard elements will project from the surfaces of the tread and be immediately effective to increase the traction properties of the tread.

8. The method of forming the rubber tread of a tire incorporating hard traction elements therein comprising, lining portions of the tread forming surfaces of a tire mold with an impressionable material, placing hard traction elements within said mold, then vulcanizing the tread of a tire in the mold by the application of heat and pressure to the interior of the tire whereby the elements will be forced into both the tread and the impressionable lining material so that portions of said elements will be anchored in the tread and portions will project from the tread and be immediately effective to increase the traction properties of the tread.

9. The method of forming the rubber tread of a tire incorporating hard elements therein comprising assembling of an unvulcanized tread and hard traction elements in a tire mold having tread surface forming portions including impressionable material, molding and vulcanizing the tire tread by the application of heat and pressure to the mold so that the hard elements will be embedded in the impressionable material and the tire tread, and after vulcanization stripping the tire and tread from the mold and impressionable material to permit the hard elements to project from the tread traction surface to permit increased effective traction thereof.

References Cited in the file of this patent

UNITED STATES PATENTS

| | | |
|---|---|---|
| Re. 21,956 | Hawkinson | Nov. 25, 1941 |
| 1,517,208 | Gillespie et al. | Nov. 25, 1924 |
| 1,548,215 | Semler | Aug. 4, 1925 |
| 2,247,558 | Nichols | July 1, 1941 |
| 2,591,430 | Hawkinson | Apr. 1, 1952 |
| 2,591,934 | Hawkinson | Apr. 8, 1952 |
| 2,644,984 | Crooker | July 14, 1953 |
| 2,666,470 | Kimes | Jan. 19, 1954 |
| 2,722,720 | Karniol | Nov. 8, 1955 |
| 2,732,589 | Steadman | Jan. 31, 1956 |